(12) United States Patent
Yoshida et al.

(10) Patent No.: US 7,055,321 B2
(45) Date of Patent: Jun. 6, 2006

(54) SUSPENSION MECHANISM FOR STIRLING CYCLE ENGINE

(75) Inventors: Katsuhiko Yoshida, Niigata-ken (JP); Kanya Ito, Niigata-ken (JP); Yong-Rak Kwon, Athens, OH (US)

(73) Assignees: Twinbird Corporation (JP); Global Cooling B.V. (NL)

( * ) Notice: Subject to any disclaimer, the term of this patent is extended or adjusted under 35 U.S.C. 154(b) by 0 days.

(21) Appl. No.: 11/123,521

(22) Filed: May 6, 2005

(65) Prior Publication Data

US 2005/0252208 A1  Nov. 17, 2005

(30) Foreign Application Priority Data

May 14, 2004 (JP) ............................. 2004-144966

(51) Int. Cl.
*F01B 29/10* (2006.01)
(52) U.S. Cl. .................................................. 60/517
(58) Field of Classification Search ................ 60/517, 60/524
See application file for complete search history.

(56) References Cited

U.S. PATENT DOCUMENTS

| | | | |
|---|---|---|---|
| 1,554,501 A | | 9/1925 | Horle et al. |
| 2,615,707 A | | 10/1952 | Rowe et al. |
| 2,852,223 A | | 9/1958 | Roberts |
| 4,811,563 A | * | 3/1989 | Furuishi et al. ............... 60/517 |
| 5,117,695 A | | 6/1992 | Henderson et al. |
| 5,139,242 A | * | 8/1992 | Yarr ........................... 267/160 |
| 6,809,486 B1 | * | 10/2004 | Qiu et al. .................... 318/135 |
| 6,983,593 B1 | * | 1/2006 | Gregory et al. ............... 60/517 |
| 2002/0088237 A1 | | 7/2002 | Rudick et al. |
| 2005/0166590 A1 | * | 8/2005 | Alderson et al. .............. 60/516 |

FOREIGN PATENT DOCUMENTS

| | | |
|---|---|---|
| DE | 74 03 814 U | 5/1974 |
| GB | 650 211 A | 2/1951 |
| JP | 58 131443 A | 8/1983 |
| JP | 2003-311859 | 3/2005 |
| WO | WO 03/042566 A2 | 5/2003 |

* cited by examiner

*Primary Examiner*—Hoang Nguyen
(74) *Attorney, Agent, or Firm*—Akerman Senterfitt

(57) ABSTRACT

A suspension mechanism capable of absorbing vibrations in all directions of a Stirling cycle engine 10. The suspension mechanism comprises the Stirling cycle engine 10 including nut members 30 on an outer surface of a casing 28, a holding ring 32 fixed to the nut members 30 substantially coaxially with the Stirling cycle engine 10, a holding cylinder 40 provided so as to cover an outside of the holding ring 32 substantially coaxially therewith; first mounting portions 36 formed in the plural number in one end of an axial direction of the holding ring 32; second mounting portions 38 formed in the same number as that of the first mounting portions 36 in the other end of the axial direction of the holding ring 32; third mounting portions 42 formed in response to the first mounting portions 36 in one end of an axial direction of the holding cylinder 40; fourth mounting portions formed in response to the second mounting portions 38 in the other end of the axial direction of the holding cylinder 40; first extension coil springs 50 suspended between the first mounting portions 36 and the third mounting portions 42; and second extension coil springs 52 suspended between the second mounting portions 38 and the fourth mounting portions 44.

15 Claims, 6 Drawing Sheets

SUSPENSION MECHANISM FOR STIRLING CYCLE ENGINE

TECHNICAL FIELD

The present invention pertains to a suspension mechanism for mounting a Stirling cycle engine to equipment in which the Stirling cycle engine is to be incorporated.

BACKGROUND OF INVENTION

Heretofore, in equipment using a free-piston type Stirling cycle engine, a vibration absorbing unit for absorbing vibrations of the Stirling cycle engine itself (hereinafter referred to as internal vibrations) has been provided in the Stirling cycle engine itself. This vibration absorbing unit, however, cannot absorb the internal vibrations completely and therefore a suspension mechanism has been used for blocking the internal vibrations so as not to transmit the vibrations from the Stirling cycle engine incorporated in the equipment to other portions. As an equipment provided with this type of suspension mechanism for the Stirling cycle engine, the applicant of the present invention once filed a patent application for a refrigerator 100 including a suspension mechanism according to a general technology for supporting legs 104 provided in the Stirling cycle engine 102, as shown in FIG. 6, wherein the legs 104 are sandwiched by means of compression springs 106, 108 from an upper side and lower side of the Stirling cycle engine 102 in an axial direction thereof (Japanese patent application 2003-311859).

According to this suspension mechanism for the Stirling cycle engine, axial vibration components among the internal vibrations of the Stirling cycle engine can be sufficiently absorbed, so that the internal vibration components transmitted to the equipment in which the Stirling cycle engine is incorporated can be substantially decreased. There has been a problem, however, that vibration components in a direction intersecting with an axis of the Stirling cycle engine among the internal vibrations, which are caused by installation error or the like, could not be sufficiently reduced. Further, it has also been a problem that among vibrations caused by swinging or rocking that takes place when the equipment in which the Stirling cycle engine is incorporated is conveyed and moved (hereafter referred to as external vibrations), the vibration components in the direction intersecting with the axis of the Stirling cycle engine can not be sufficiently absorbed. This problem is attributed to the fact that since the compression springs are used in the suspension mechanism, when the Stirling cycle engine vibrates in the direction intersecting with the axis of the Stirling cycle engine, the compression springs extend and thus not only the compression springs fail to function so as to resist against the movement of the Stirling cycle engine but a guiding shaft parallel to the axial direction of the Stirling cycle engine needs to be provided in the center of the compression spring in order that the suspension mechanism operates normally, and thus the compression springs collide with the guiding shaft when the vibrations of the Stirling cycle engine occur in the direction intersecting with its axis.

SUMMARY OF THE INVENTION

The present invention aims at solving the problems mentioned above. Therefore, it is an object of the present invention to provide a suspension mechanism that can absorb vibrations of the Stirling cycle engine in every direction to sufficiently attenuate the vibrations transmitted from the Stirling cycle engine to equipment and at the same time can sufficiently absorb the vibrations transmitted from the equipment to the Stirling cycle engine.

According to a first aspect of the present invention, there is provided a suspension mechanism for the Stirling cycle engine comprising: a Stirling cycle engine including fixing portions on an outer surface of a casing; a holding ring fixed to the fixing portions substantially coaxially with the Stirling cycle engine; a holding cylinder provided so as to cover an outside of the holding ring substantially coaxially therewith; first mounting portions formed on one end of the holding ring in an axial direction thereof; second mounting portions formed on an other end of the holding ring in an axial direction thereof, the number of the second mounting portions being the same as that of the first mounting portions; third mounting portions formed in response to the first mounting portions on one end of the holding cylinder in an axial direction thereof; fourth mounting portions formed in response to the second mounting portions on an other end of the holding cylinder in an axial direction thereof; first extensible type resilient members suspended between the first mounting portions and the third mounting portions; and second extensible type resilient members suspended between the second mounting portions and the fourth mounting portions.

In the suspension mechanism for the Stirling cycle engine according to the first aspect, the following advantages are effected by the structure described above in the case that the Stirling cycle engine and the holding ring vibrate together by the internal vibrations. Namely, between the holding ring and the holding cylinder provided so as to cover the outside of the holding ring, there are provided a plurality of pairs of the suspension mechanisms comprising the first extensible type resilient members suspended between the first mounting portions and the third mounting portions and the second extensible type resilient members suspended between the second mounting portions and the fourth mounting portions. Hence, among the internal vibrations, vibration components of the axial direction of the Stirling cycle engine i.e., the vibration components of the axial direction of the holding ring and holding cylinder are sufficiently reduced by means of each of the extensible type resilient members, while among the internal vibrations, the vibration components in the direction intersecting with the axis i.e., the vibration in a direction that axes of the holding ring and holding cylinder deviates from each other can be sufficiently decreased by each of the extensible type resilient members. Consequently, the internal vibrations transmitting to all directions are absorbed, so that little or no vibration can be transmitted from the Stirling cycle engine to the holding cylinder, and eventually to equipment on which the holding cylinder is mounted. Similarly, due to swinging of the equipment, eventually of the holding cylinder mounted on the equipment, the external vibrations transmitted to the Stirling cycle engine and the holding ring can be sufficiently absorbed by the suspension mechanism.

A second aspect of the present invention is a suspension mechanism for the Stirling cycle engine according to the first aspect, wherein the fixing portions include female screws, while the holding ring is formed with first through-holes so that the holding ring may be mounted to the fixing portions by screwing male screws thereinto, and the holding cylinder is formed with second through-holes, the second through-holes being larger than the first through-holes in diameter, formed opposite to the first through-holes.

According to the suspension mechanism for the Stirling cycle engine of the second aspect, even if the Stirling cycle engine vibrates in the direction intersecting with its axis relative to the holding cylinder, the male screws are allowed to thrust into the second through-holes, and hence, a collision between the holding cylinder and the male screws can be prevented.

A third aspect of the present invention is a suspension mechanism for the Stirling cycle engine as set forth in the second aspect, wherein there are provided protectors made from a cushioning material in edges of the second through-holes.

According to the suspension mechanism for the Stirling cycle engine set forth in the third aspect, even if the male screws vibrate inside the second through-holes in the axial direction of the Stirling cycle engine to collide with the edges of the second through-holes, due to composite vibrations of the Stirling cycle engine both in its axial direction and in the direction intersecting with its axis relative to the holding cylinder, the male screws are allowed to abut against the protectors made of the cushioning material, so that the impact shock by the collision can be cushioned.

A fourth aspect of the present invention is a suspension mechanism for the Stirling cycle engine as set forth in the third aspect, wherein the second through-holes are closed by the protectors.

According to the suspension mechanism for the Stirling cycle engine according to the fourth aspect, even if the Stirling cycle engine widely vibrates in the direction intersecting with its axis relative to the holding cylinder, the male screws collide with the protectors for closing the second through-holes, so that the impact shock of the collision can be cushioned.

BRIEF DESCRIPTION OF THE DRAWING

The invention will be more readily understood by reference to the following description, taken with the accompanying drawings, in which.

DETAILED DESCRIPTION OF PREFERRED EMBODIMENT

Hereunder is a description of one preferred embodiment of a suspension mechanism for a Stirling cycle engine according to the present invention with reference to the accompanying drawings.

FIG. 1 to FIG. 5 are the drawings for illustrating one embodiment of the suspension mechanism for the Stirling cycle engine according to the present invention.

Figure 1:
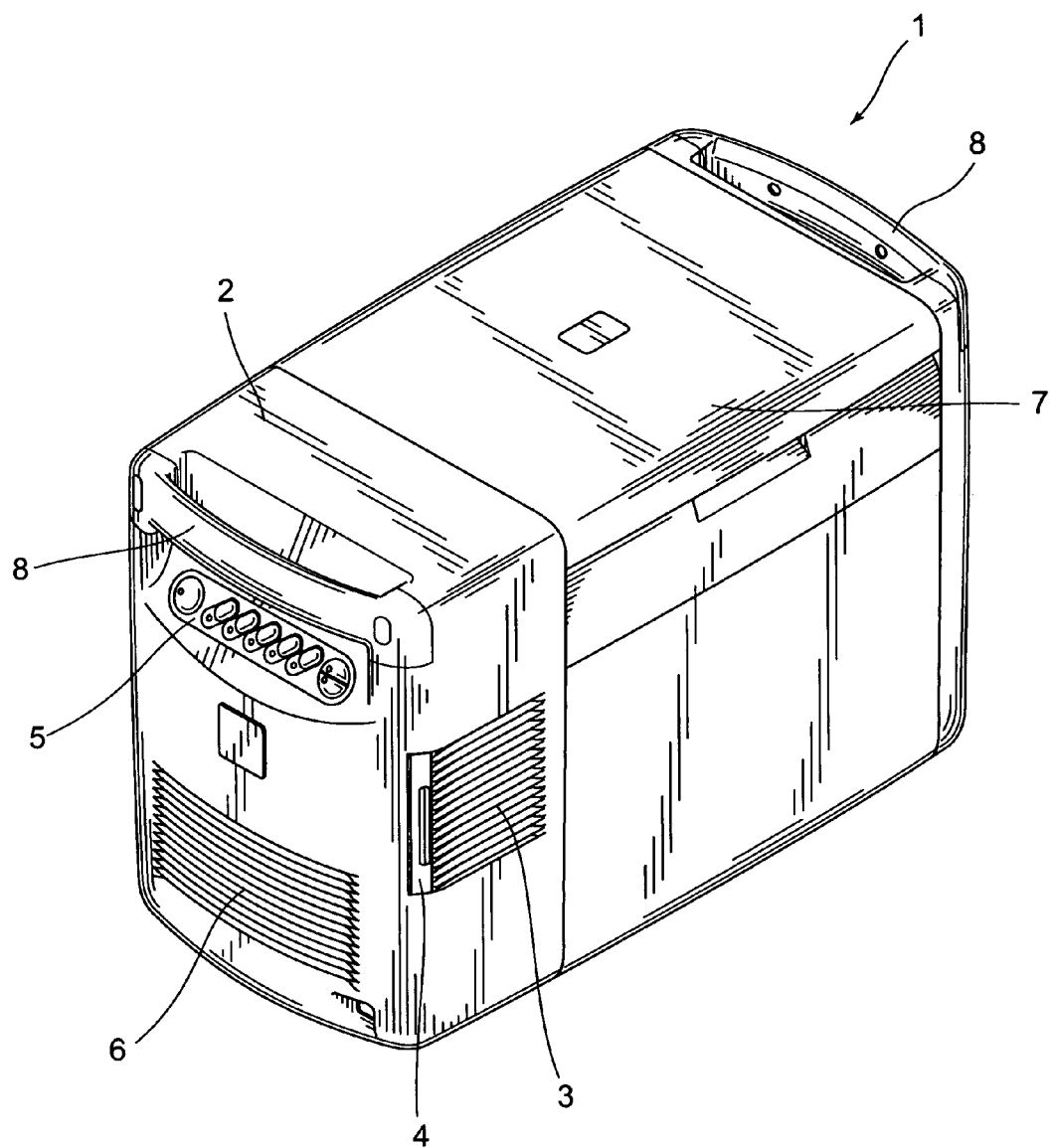
FIG. 1 is a perspective view illustrating a portable type storage container to which a suspension mechanism for a Stirling cycle engine according to the present invention is applied.

FIG. 1 is a perspective view illustrating a portable type storage container 1 to which the present embodiment is applied. The portable type storage container 1 is equipped with a container box 2, which makes up an outside wall of the portable type storage container 1. In a left side viewed from a front of the container box 2, suction openings 3 are formed for sucking outside air into the container box 2. In an inside of the suction openings 3, a filter 4 is provided that eliminates dust from the outside air sucked from the suction openings 3. An operational section 5 for operating the portable type storage container 1 is provided in an upper portion of the left side of the container box 2. Exhaust openings 6 for exhausting the outside air sucked from the suction openings 3 into the container box 2 are formed in a lower portion of the left side of the container box 2. A cover 7 for opening and closing an upper opening of the portable type storage container 1 is provided in a top of the container box 2. Further, a gripper 8 for carrying about the portable type storage container 1 is provided at both end sides of the top of the container box 2.

Figure 2:
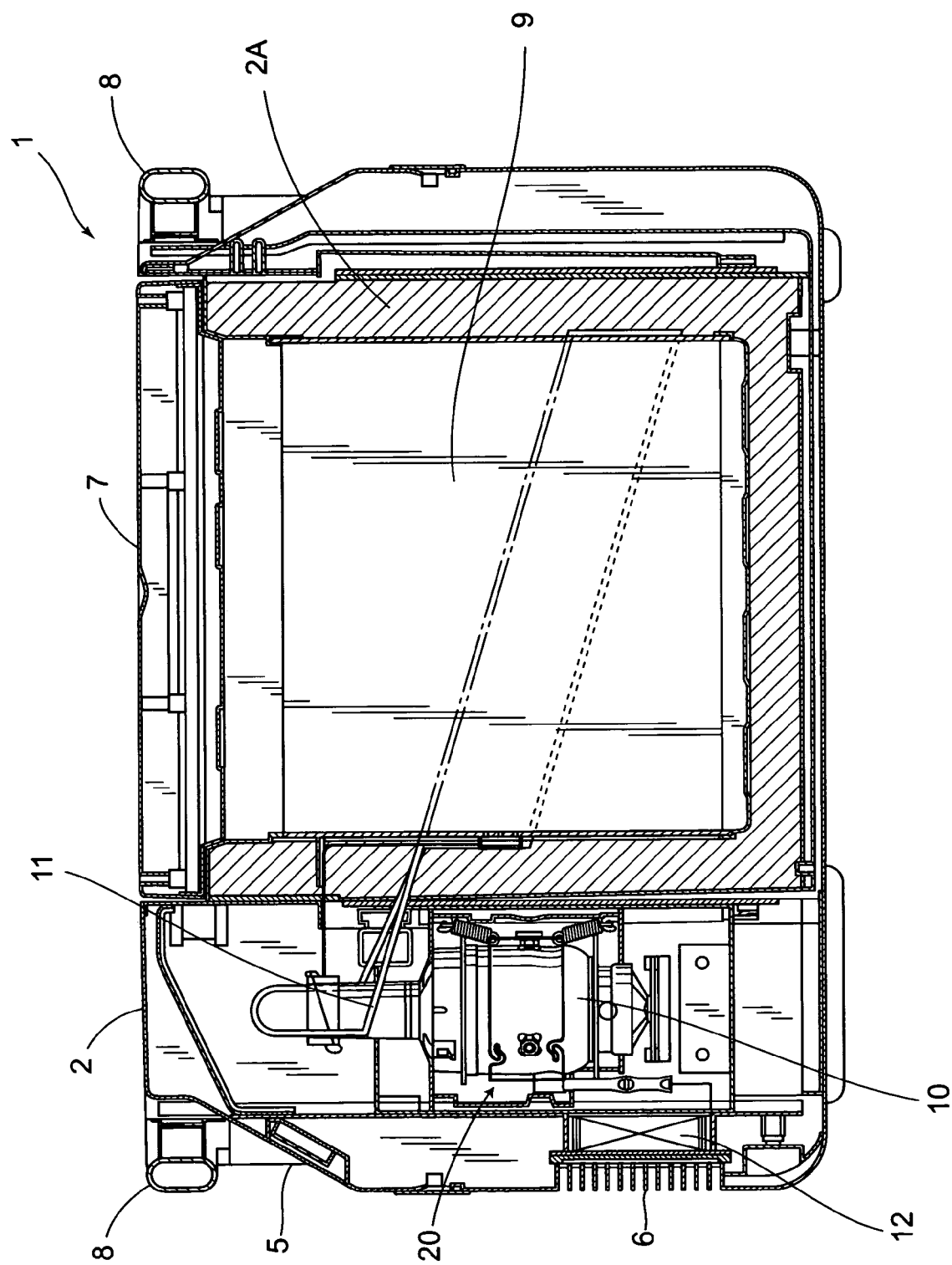
FIG. 2 is a longitudinal sectional view illustrating the portable storage container in FIG. 1.

FIG. 2 is a longitudinal sectional view of the portable type storage container 1. A storage section 9 surrounded by a thermal insulation member 2A is provided in the portable type storage container 1. The Stirling cycle engine 10 serving as a temperature regulation unit is provided on a left side of the storage section 9. In addition, the Stirling cycle engine 10 is well-known and therefore description thereof is omitted. A thermosiphon 11 comprising a copper pipe is connected to an apical end of the Stirling cycle engine 10 that becomes low in temperature, while the copper pipe of the thermosiphon 11 is fixed to a periphery of the storage section 9 in a thermally contact state thereto. Consequently, the apical end of the Stirling cycle engine 10 is cooled by driving the Stirling cycle engine 10 and thus cold energy moves by means of a refrigerant (not shown) inside the thermosiphon 11, so that the storage section 9 is cooled. An air blower 12 for sucking the outside air from the suction openings 3 to send the outside air to the Stirling cycle engine 10 is provided on the underside of a left side of the Stirling cycle engine 10. Then, the air blower 12 cools an after-mentioned middle cylindrical portion 24 where a drive section of the Stirling cycle engine 10 is housed and radiation fins 54 which are mounted on a base (radiation section) of an upper cylindrical portion 22. Additionally, the Stirling cycle engine 10 is held by a Stirling cycle engine unit 20 equipped with the suspension mechanism for the Stirling cycle engine 10.

Figure 3:
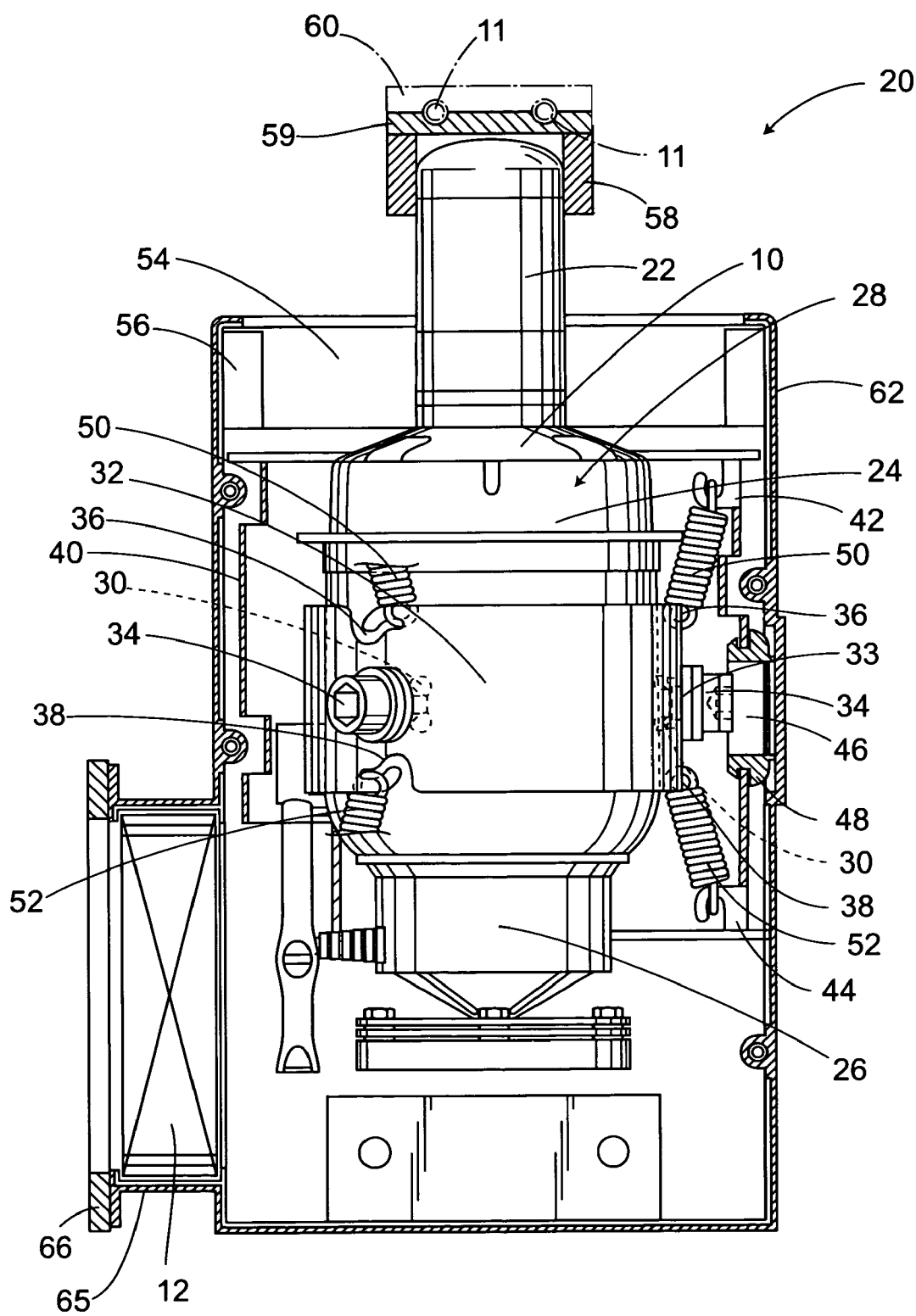
FIG. 3 is a longitudinal sectional view illustrating the suspension mechanism for the Stirling cycle engine according to the present invention.
Figure 4:
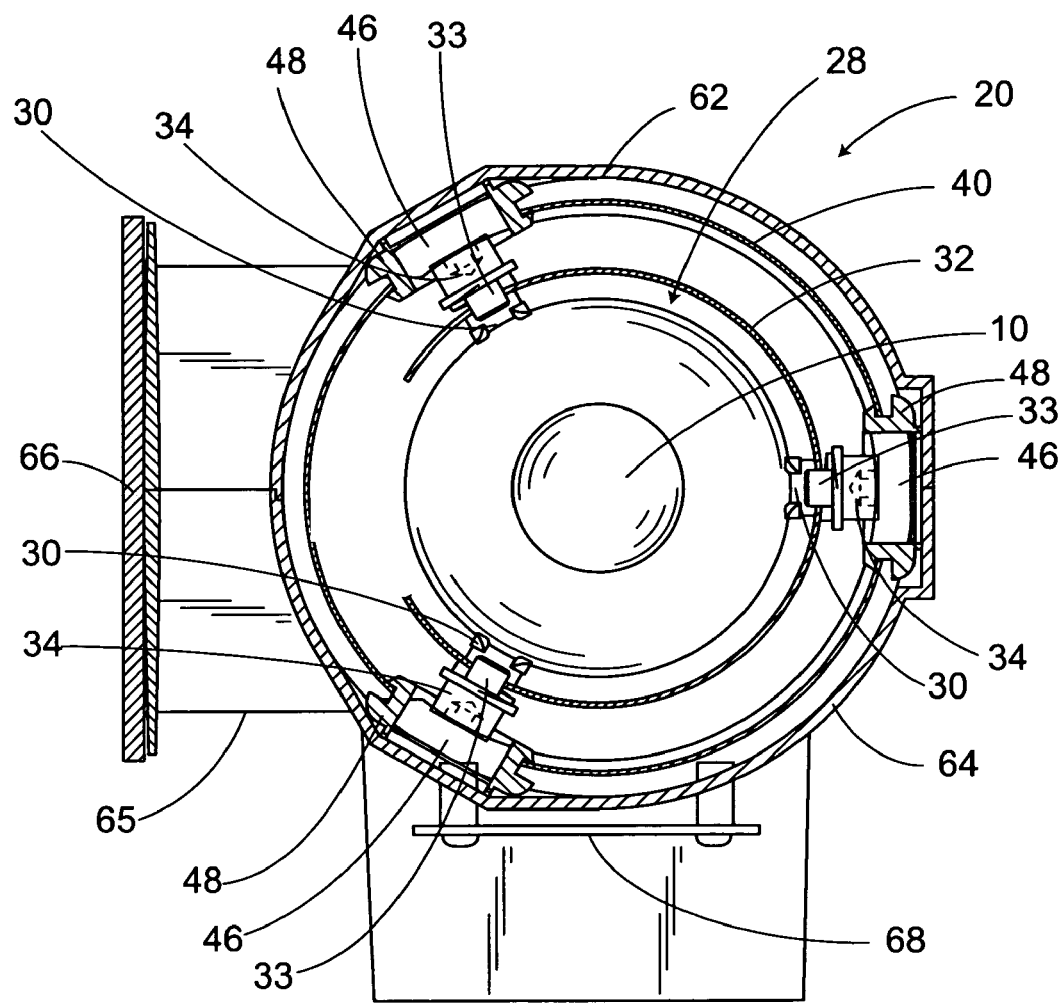
FIG. 4 is a transverse sectional view illustrating the suspension mechanism for the Stirling cycle engine according to the present invention.
Figure 5:
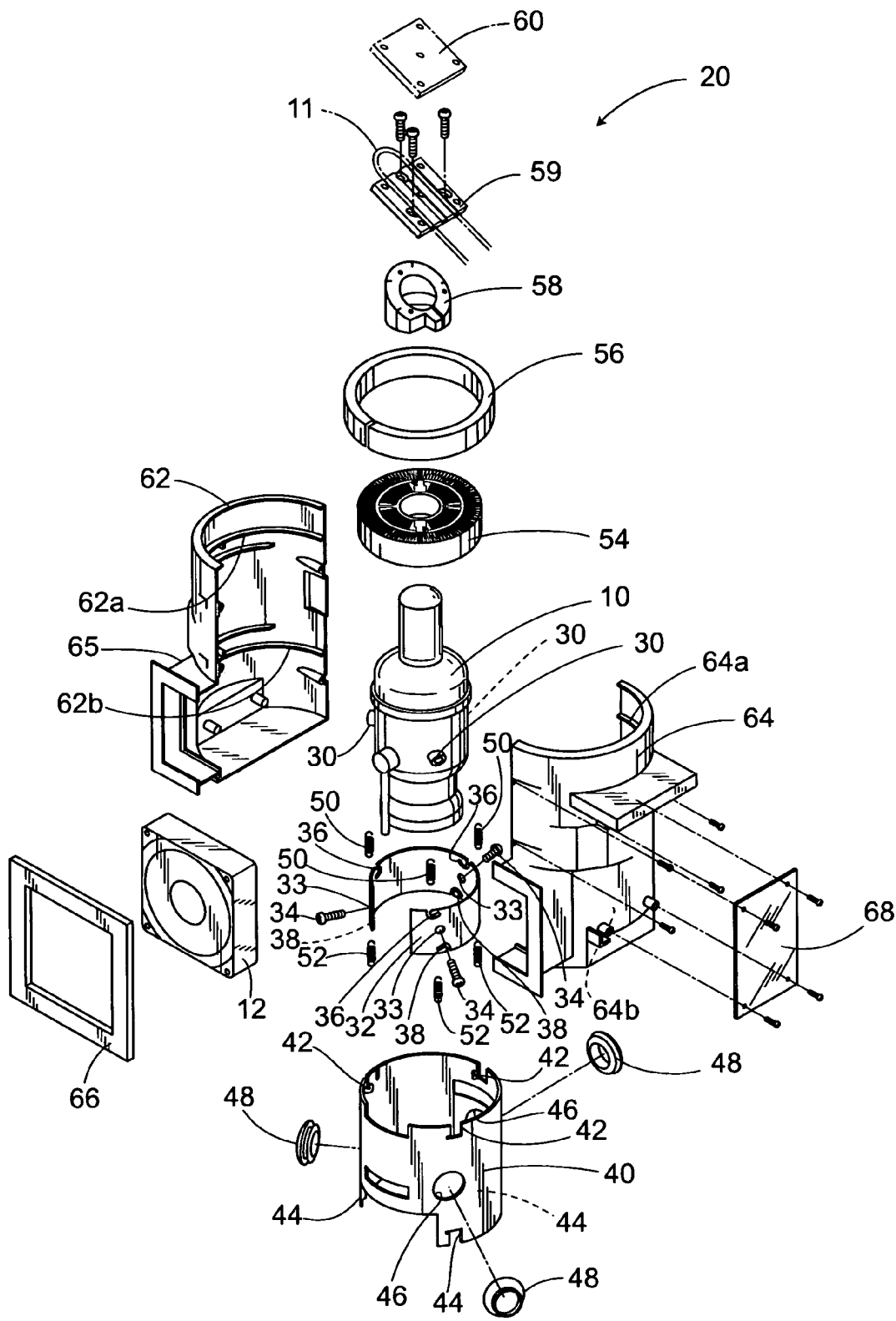
FIG. 5 is an exploded perspective view illustrating the suspension mechanism for the Stirling cycle engine according to the present invention.
Figure 6:
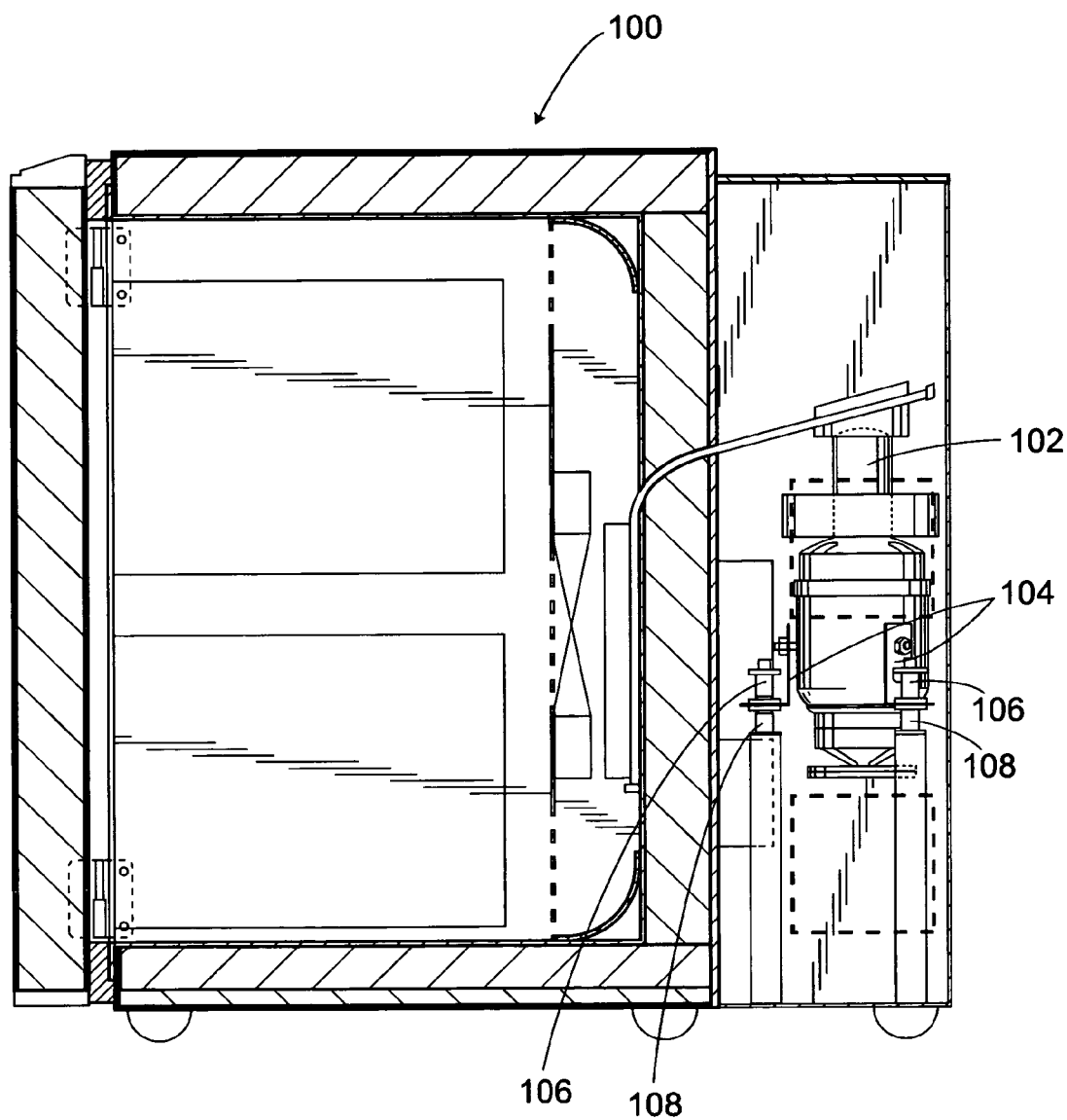
FIG. 6 is a longitudinal sectional view illustrating a refrigerator with conventional technology of the suspension mechanism for the Stirling cycle engine.

FIG. 3 to FIG. 5 illustrate the Stirling cycle engine unit 20 equipped with the suspension mechanism for the Stirling cycle engine 10 according to the present embodiment. FIG. 3 is a longitudinal sectional view of the Stirling cycle engine unit 20, FIG. 4 is a traverse sectional view of the same, and FIG. 5 is an exploded perspective view of the same. The Stirling cycle engine 10 comprises the upper cylindrical portion 22 formed into a substantially cylindrical shape in its upper portion, the middle cylindrical portion 24 that is substantially coaxial with the upper cylindrical portion 22 and is formed into a substantially cylindrical shape in its middle portion, and a lower cylindrical portion 26 that is substantially coaxial with the middle cylindrical portion 24 and is formed in a substantially cylindrical shape in its lower portion, while the Stirling cycle engine 10 includes a casing 28 for constituting an outside wall of the Stirling cycle engine 10. On an outer surface of the casing 28, nut members 30 inside which female screws are provided and which serve as fixing portions are positioned at substantially the same locations to one another with respect to a vertical direction and are firmly fixed to a plurality of locations by welding or the like (three locations shown in the figures) so as to be substantially uniformly spaced in angle around the axis of the Stirling cycle engine 10.

Outside the nut members 30, a holding ring 32 is formed so as to be substantially C-shaped and substantially cylinder-shaped in a traverse section and further so that its radius be substantially equal to a distance from the axis of the Stirling cycle engine 10 to an outer end face of the nut member 30. In the holding ring 32, first through-holes 33 are formed that are opposed to the plurality of the nut members 30 firmly fixed to the outer surface of the casing 28 and further first through-holes 33 are substantially uniformly spaced in angle with respect to a horizontal direction, and are smaller in diameter than the outer end face of the nut members 30, the number of the first through-holes 33 formed being the same as that of the nut members 30. The holding ring 32 is fixed to the Stirling cycle engine 10 in such a way as follows: bolts 34, including a lager diametrical head than the first through-hole 33 and a shaft that is smaller in diameter than the first through-hole 33 and further is provided with external threads, penetrate the first through-hole 33 and then by making bolts 34 and the nut members 30 screw together, the holding ring 32 is fixed to the Stirling cycle engine 10. On an upper end in an axial direction of the holding ring 32, first mounting portions 36 are formed in a plurality of locations (three locations shown in the figures) so as to be positioned mutually at substantially identical locations in the vertical direction and so as to be uniformly spaced mutually in angle in the horizontal direction. The first mounting portions 36 are formed into a hook-like shape that is substantially flush with the holding ring 32 and besides faces the downside by cutting out a portion near an upper end of the holding ring 32. In addition, the first mounting portions 36 are formed at substantially vertically upper side of the first through-holes 33. On a lower end of the axial direction of the holding ring 32, a second mounting portions 38 are formed in a plurality of locations (three locations shown in the figures) so as to be positioned mutually at a substantially identical location in the vertical direction and so as to be substantially uniformly spaced mutually in angle in the horizontal direction. The second mounting portions 38 are formed into a hook-like shape that is substantially flush with the holding ring 32 and besides face the upside by cutting out a portion near a lower end of the holding ring 32. In addition, the second mounting portions 38 are formed at a substantially vertically lower side of the first through-holes 33.

Outside the bolts 34 for fixing the holding ring 32 to the Stirling cycle engine 10, there is provided a holding cylinder 40 formed into a substantially cylindrical shape substantially coaxially with the Stirling cycle engine 10. On an upper end of an axial direction of the holding cylinder 40, a third mounting portions 42 are formed in a plurality of locations (three locations shown in the figures) so as to correspond to the first mounting portions 36 of the holding ring 32 and, with a central focus on the axis of the Stirling cycle engine 10, further so as to be substantially uniformly spaced mutually in angle in the horizontal direction as well as so as to be positioned at an outside of a radial direction of the first mounting portions 36 and mutually at a substantially identical location in the vertical direction. The third mounting portions 42 are formed into a hook-like shape facing the upside by cutting out and bending inward a portion near an upper end of the holding cylinder 40. In a lower end side of the axial direction of the holding cylinder 40, fourth mounting portions 44 are formed in a plurality of locations (three locations shown in FIG. 3 to FIG. 5) so as to correspond to the second mounting portions 38 of the holding ring 32 and, with a central focus on the axis of the Stirling cycle engine 10, so as to be substantially uniformly spaced mutually in angle in the horizontal direction as well as so as to be positioned radially outside the second mounting portions 38 and at a substantially mutually identical location in the vertical direction. The fourth mounting portions 44 are formed into a hook-like shape facing downward by cutting out and bending inward a portion near a lower end of the holding cylinder 40. With a central focus on the axis of the Stirling cycle engine 10, second through-holes 46 that are larger than the first through-holes 33 and also larger than an outer end face of the heads of the bolts 34 in diameter are formed at locations in said holding cylinder 40 that are radially outside the first through-holes 33 and are opposed to the first through-hole 33 of the holding ring 32 and are substantially flush with the first through-holes 33.

In the edge of the second through-hole 46 formed in the holding cylinder 40, grommets 48 serving as a protector made of a cushioning material are fitted. The grommets 48 are formed into a bottomed and substantially cylindrical shape, while a groove is formed in an outer circumference of the grommet 48. Opening sides of the grommets are inserted into the second through-holes 46 from the outside of the holding cylinder 40 and then by fitting edges of the second through-holes 46 in the grooves, the grommets are fixed to the holding cylinder 40. Further, since the grommets 48 are, as above-mentioned, formed into a bottomed and substantially cylindrical shape, they close the second through-holes 46. Additionally, in the grommet 48, its opening side is larger than the outer end face of the head of the bolt 34 in diameter and a gap between its bottom and the outer end face of the head of the bolt 34 is formed when the Stirling cycle engine 10 is in a state of no vibration. In a state where the grommet is fitted in the second through-hole 46, the opening side of the grommet 48 is formed so as to overlap with an apical end of the bolt 34 when viewed vertically. In addition, specifically, EPDM (Ethylene Propylene Diene Monomer) is mentioned as a raw material of the grommet 48.

A first extension coil spring 50 serving as a first extensible resilient member is suspended between the first mounting portion 36 formed in the holding ring 32 and the third mounting portion 42 formed in the holding cylinder 40 in response to the first mounting portion 36. In the first extension coil spring 50, one of hooks provided in its one end engages the first mounting portion 36 formed into a downward hook-like shape to extend the first extension coil spring 50, while the other hook provided in its other end engages with the third mounting portion 42 formed in an upward hook-like shape. Thus, the first extension coil spring 50 is suspended therebetween. Further, a second extension coil spring 52 serving as a second extensible resilient member is suspended between the second mounting portion 38 formed in the holding ring 32 and the fourth mounting portion 44 formed in the holding cylinder 40 in response to the second mounting portion 38. In the second extension coil spring 52, one of hooks provided in its one end engages with the second mounting portion 38 formed into an upward hook-like shape to stretch the second extension coil spring 52, while the other hook provided in its other end engages with the fourth mounting portion 44 formed in an downward hook-like shape to be suspended. Thus, the second extension coil spring 52 is suspended therebetween. Then, by the first and second extension coil springs 50, 52, the holding ring 32, eventually the Stirling cycle engine 10 mounted with the holding ring 32 is suspended against the holding cylinder 40.

Further, to a base of the upper cylindrical portion 22 serving as the radiation portion of the Stirling cycle engine 10, the radiation fins 54 is firmly fixed that is intended for cooling the base and is formed into a substantially short cylindrical shape.

Furthermore, in an outer circumference of the radiation fins 54, there is provided a radiation fin cover 56 for preventing cooling air from flowing through the outer circumference of the radiation fins 54.

A first heat transmission block 58 whose upper surface is formed into a slope and substantially cylindrical shape and further is intended to transfer cold energy is firmly fixed to an apical end of the upper cylindrical portion 22 of the Stirling cycle engine 10. Besides, to an upper surface of the first heat transmission block 58, a second heat transmission block 59 is fixed that is formed into a substantially rectangular shape and further is formed with, between both ends of its upper surface, grooves having a semi-circular cross-section for supporting the tubular thermosiphon 11 by sandwiching it. In addition, the thermosiphon 11 is sandwiched and supported between the third heat transmission block 60 and the second heat transmission block 59, while the third heat transmission block 60 is formed into a substantially rectangular shape and further is formed with, between both ends of the underside thereof, grooves having a semi-circular cross-section for supporting the tubular thermosiphon 11 by sandwiching it.

There are provided a first casing 62 and a second casing 64 intended to fix the holding cylinder 40 to the container box 2 of the portable type container 1 by using the first and second extension coil springs 50, 52. The holding cylinder 40 hangs the Stirling cycle engine 10 to which the holding ring 32 is fixed by the first and second extension coil springs 50, 52. These first and second casings 62, 64 are formed into a bottomed and substantially semi-circular shape so that a distance from the axis of the Stirling cycle engine 10 to an outer peripheral surface of each of the casings 62, 64 becomes equal to an approximate radius of themselves as well as substantially coaxially with the Stirling cycle engine 10. In an inner circumference of the first casing 62 are formed an upper overhang 62a and a lower overhang 62b so as to be protruded to a length substantially equal to a vertical length of the holding cylinder 40. Likewise, in an inner circumference of the second casing 64 are formed an upper overhang 64a and a lower overhang 64b so as to be protruded to a length substantially equal to a vertical length of the holding cylinder 40. When the first casing 62 and the second casing 64 are coupled together, the overhang 62a of the first casing 62 and the overhang 64a of the second casing 64 are formed so as to be at a substantially identical level relative to a vertical direction, and the overhang 62b of the first casing 62 and the overhang 64b of the second casing 64 also are formed so as to be at a substantially identical level relative to a vertical direction. The first casing 62 and the second casing 64 support the holding cylinder 40 by horizontally sandwiching it, while sandwiching and supporting the holding cylinder 40 between the upper overhangs 62a, 64a of each of the casings 62, 64 and the lower overhangs 62b, 64b of each of the casings 62, 64. In the meantime, the first and second casings 62 and 64 are fixed to the container box 2 of the portable container 1.

On the underside of the first and second casings 62, 64, there is provided the air blower 12 for sucking outside air from the suction openings 3 to send it to the Stirling cycle engine 10. Further, a protrusion 65 for the air blower is formed in the first and second casings 62, 64, so as to match ends of a front face and rear face of the air blower 12 when viewed horizontally. Furthermore, the first and second casings 62, 64 sandwiches air blower 12b between the protrusions 65, 65 for the air blower to fix the air blower. A packing 66 with a substantially rectangular opening formed so as to secure an air sending passage of the air blower 12 is firmly fixed to an outside surface of the protrusions 65, 65 for the air blower 12 formed in the first and second casings 62, 64.

To a side surface of the second casing 64, a printed-circuit board 68 is fixed that is formed into a substantially rectangular shape and used for controlling the Stirling cycle engine 10 based on signals from the operational section 5.

Next is a description of behavior of the suspension mechanism for the Stirling cycle engine 10 made up as described above. The Stirling cycle engine 10 vibrates relative to the holding cylinder 40 by the internal vibrations caused by dive of the Stirling cycle engine 10, and the external vibrations caused by manual carriage and automobile transportation of the portable type container 1 mounted with the Stirling cycle engine 10. When the Stirling cycle engine 10 vibrates in its axial direction relative to the cylinder 40, one of the first and second extension coil springs 50, 52 for hang the holding ring 32 and the Stirling cycle engine 10 against the holding cylinder 40 fixed to the container box 2 extends and the other compresses and thus the vibrations are absorbed by resiliency, internal friction or the like of the first and second extension coil springs 50, 52. In other words, when the Stirling cycle engine 10 vibrates downward relative to the holding cylinder 40 by the internal or external vibrations, the first extension coil spring 50 extends to resist the movement of the Stirling cycle engine 10. Similarly, when the Stirling cycle engine 10 vibrates upward relative to the holding cylinder 40 by the internal or external vibrations, the second extension coil spring 52 is led to extend to resist the movement of the Stirling cycle engine 10. By iterating the actions, the vibrations of the Stirling cycle engine 10 in relation to the holding cylinder 40 are led to be absorbed. Then, by the extension and compression of the first and second extension coil springs 50, 52, the kinetic energy caused by the vibrations of the Stirling cycle engine 10 relative to said holding cylinder 40 is converted into thermal energy through internal friction of the first and second coil springs 50, 52.

Furthermore, when the Stirling cycle engine 10 vibrates in the direction intersecting with its axis relative to the holding cylinder 40, any set (one or two sets in the present embodiment) of the first and second extension coil springs 50, 52 that are provided to hang the holding ring 32 and the Stirling cycle engine 10 from the holding cylinder 40 fixed to the container box 2 is allowed to extend while the other set to compress, and as a result, the vibrations are absorbed by the resiliency, the internal friction and the like of the first and second extension coil springs 50, 52. In other words, when the Stirling cycle engine 10 moves leftward in FIGS. 3, 4 relative to the holding cylinder 40 by the internal and external vibrations, a set of the first and second extension coil springs 50, 52 mounted on a right side in FIGS. 3,4 is led to extend, resulting in resistance of the set of the extension coil springs 50, 52 to the movement of the Stirling cycle engine 10. Similarly, when the Stirling cycle engine 10 moves rightward in FIGS. 3, 4 relative to the holding cylinder 40 by the internal or external vibrations, the two sets of the extension coil springs 50, 52 mounted on a left side in FIGS. 3,4 are led to extend, resulting in resistance of these sets of the extension coil springs 50, 52 to the movement of the Stirling cycle engine 10. By iterating these actions, the vibrations of the Stirling cycle engine 10 to the holding cylinder 40 are absorbed. Further, the extension and compression of the first and second extension coil springs 50, 52 can convert the kinetic energy caused by the vibrations of the Stirling cycle engine 10 relative to said holding cylinder 40 into thermal energy through internal friction of the first and second extension coil springs 50, 52.

As a result, the internal vibrations transmitted from the Stirling cycle engine 10 to the holding cylinder 40, eventually to the container box 2 via each of the extension coil springs 50, 52 can be sufficiently reduced due to the foregoing iterated actions in cooperation with the suspension of the Stirling cycle engine 10 to the holding cylinder 40 by the extension coil springs 50, 52 made of comparatively thin wires. Further, the external vibrations in all directions resulting from swinging of the container box 2 can be also sufficiently absorbed to be able to attenuate rapidly the swinging of the Stirling cycle engine 10 due to the external vibrations.

In addition, the extension coil springs 50, 52 are hooked, respectively, on the first mounting portion 36 and the second mounting portion 38 formed in the holding ring 32 fixed by the bolts 34 to the nut members 30 of the casing 28 of the Stirling cycle engine 10. Hence, even if the Stirling cycle engine 10 vibrates relative to the holding cylinder 40, a relative position of each of the mounting portions 36, 38, eventually a relative position of each of the extension coil springs 50, 52 to the Stirling cycle engine 10 is unchanged. As a result, the Stirling cycle engine 10 and the holding cylinder 40 can be kept coaxial with each other. Thus, the vibrations of the Stirling cycle engine 10 due to the internal and the external vibrations can be sufficiently absorbed.

Further, when the Stirling cycle engine 10 vibrates a little in the direction intersecting with its axis relative to said holding cylinder, since the head of the bolt 34 for fixing the holding ring 32 to the Stirling cycle engine 10 thrusts into the second through-hole 46, the bolt 34 and the holding cylinder 40 are prevented from colliding against each other. Thus, not only a noise generated by the collision of the bolt 34 and the holding cylinder 40 can be prevented but the failure of the Stirling cycle engine 10 by the collision can also be prevented. Further, when the Stirling cycle engine 10 vibrates widely in the direction intersecting with its axis relative to said holding cylinder, an outer end face of the head of the bolt 34 collides against the bottom of the grommet 48 made from the cushioning material such as EPDM or the like mounted on the second through-hole 46. Thus, an amplitude of the Stirling cycle engine 10 in the direction intersecting with its axis is limited to prevent plastic deformation resulting from large deformation of the first and second extension coil springs 50, 52. Further, since impact shock generated when the head of the bolt 34 collide against the grommet 48 is cushioned by viscosity and resiliency of the material making up the grommet 48. Hence, the failure of the Stirling cycle engine 10 mounted with the bolts 34 is prevented. Further, when the Stirling cycle engine 10 vibrates compositively widely both in its axial direction and in the direction intersecting with its axis relative to said holding cylinder, there is possibility that the head of the bolt 34 for fixing the holding ring 32 to the Stirling cycle engine 10 collide against an edge of the second through-hole 46. Since the edge of the second through-hole 46 is, however, covered with an opening of the grommet 48, the head of the bolt 34 is allowed to collide against an inner circumference of the grommet 48. As a result, an axial amplitude of the Stirling cycle engine 10 is also limited to prevent the plastic deformation due to large deformation of the first and second extension coil springs 50, 52, while the impact shock generated when the head of the bolt 34 collides against the grommet 48 is cushioned by viscosity and resiliency of the material making up the grommet 48, preventing the failure of the Stirling cycle engine 10 mounted with the bolt 34.

According to the present embodiment as described above, the suspension mechanism comprises the Stirling cycle engine 10 including the nut members 30 in the outer surface of the casing 28, the holding ring 32 fixed to the nut members 30 substantially coaxially with the Stirling cycle engine 10, the holding cylinder 40 provided so as to cover substantially coaxially the outside of the holding ring 32, the first mounting portion 36 that is formed in the plural number in one end of the axial direction of the holding ring 32, the second mounting portion 38 that is formed in the other end of the axial direction of the holding ring 32 in the same number as that of the first mounting portions 36, the third mounting portion 42 that is formed in response to the first mounting portion 36 in one end of the axial direction of the holding cylinder 40, the fourth mounting portion 44 that is formed in the other end of the axial direction of the holding cylinder 40 in response to the second mounting portion 38, the first extension coil spring 50 suspended between the first mounting portion 36 and the third mounting portion 42, and the second extension coil spring 52 suspended between the second mounting portion 38 and the fourth mounting portion 44.

According to this structure, when the Stirling cycle engine 10 vibrates relative to the holding cylinder 40 by the internal and external vibrations, the holding ring 32 fixed to the nut members 30 in the outer surface of the casing 28 of the Stirling cycle engine 10 also vibrates together with the Stirling cycle engine 10. In consideration of these vibrations, a plurality of the suspension components are provided that comprise the first extension coil spring 50 suspended between the first mounting portion 36 and the third mounting portion 42 and the second extension coil spring 52 suspended between the second mounting portion 38 and the fourth mounting portion 44. Thus, the axial and relative vibrations of the Stirling cycle engine 10 relative to the holding cylinder 40, i.e., the axial and relative vibrations of the holding ring 32 and holding cylinder 40 are absorbed by each of the extension coil springs 50, 52. Further, the vibrations of the Stirling cycle engine 10 in the direction intersecting with its axis relative to the holding cylinder 40, i.e., the relative vibrations by which axes of the holding ring 32 and holding cylinder 40 deviate from each other are also absorbed by the extension coil springs 50, 52. Thus, all directional vibration components of the internal vibrations transmitted from the Stirling cycle engine 10 to the holding cylinder 40, eventually to the container box 2 can be sufficiently reduced. Further, with regard to the external vibrations caused by the swinging of the container box 2, all directional vibration components thereof can be sufficiently absorbed by each of extension coil springs 50, 52, to be able to attenuate rapidly the swinging of the Stirling cycle engine 10 caused by the external vibrations.

According to the present embodiment, the nut members 30 include the female screws, the first through-holes 33 are formed in the holding rings 32, the holding rings 32 are mounted on the nut members 30 by the bolts 34 serving as the male screws for the nut members 30 via the first through-holes 33, while the second through-holes 46 larger than the first through-holes 33 in diameter are formed in positions opposed to the first through-holes 33 in the holding cylinder 40. Hence, even if the Stirling cycle engine 10 vibrates in the direction intersecting with its axis relative to the holding cylinder 40, the holding cylinder 40 and the bolts 34 can be prevented from colliding against each other as the heads of the bolts 34 thrust into the second through-holes 46.

Further, according to the present embodiment, since the grommets 48 made from the cushioning material are mounted on the edge of the second through-holes 46, even if the bolts 34 collide against the edges of the second through-hole 46 due to the composite vibrations of the Stirling cycle engine 10 in the axial direction and in the direction intersecting with its axis relative to said holding cylinder, the bolts 34 collide against the grommets 48 made from the cushioning material, so that the impact shock of the collision can be cushioned.

Furthermore, according to the present embodiment, since the second through-holes 46 are closed by the grommets 48, even if the Stirling cycle engine 10 vibrates in the direction intersecting with its axis relative to the holding cylinder 40, the bolts 34 collide against the grommets 48 for closing the second through-holes 46, so that the impact shock of the collision can be cushioned.

In the meantime, the present invention is not limited to the embodiment described above and various modifications are possible within the scope of the gist of the present invention. In the embodiment described above, three sets of the suspension components are provided using three of each of the first and second extension coil springs. More than three sets, however, may be provided. Further, in the embodiment described above, the first and second mounting portions are provided mutually in substantially vertically upper and lower positions in the holding ring. The second mounting portion may be provided in a half-angular-staggered space in relation to angular spaces of the first mounting portions. In other words, the second mounting portions may be provided 60 degrees apart from the first one. Furthermore, in the embodiment described above, the extension coil spring is used as an extensible type resilient member. An air spring or the like, however, may be used.

Alternatively, the first and second mounting portions may be formed directly on the casing for the Stirling cycle engine, instead of forming them on the above-mentioned holding ring. Further, the holing ring may be replaced with any suitable holding member such as simple plates provided around the casing. Furthermore, the above-mentioned holding cylinder may be provided in the form of an inner peripheral surface of the equipment where the Stirling cycle engine of the invention is installed by forming the third and fourth mounting portions on any suitable places on the inner peripheral surface. The above-mentioned protector may be provided on a head of the male screw.

What is claimed is:

1. A suspension mechanism for a Stirling cycle engine, comprising:
   a Stirling cycle engine including fixing portions on an outer surface of a casing;
   a first holding member fixed to said fixing portions;
   a second holding member provided so as to cover an outside of the first holding member substantially coaxially therewith;
   first mounting portions formed on one end of said first holding member in an axial direction thereof;
   second mounting portions formed on an other end of said first holding member in an axial direction thereof, the number of said second mounting portions being the same as that of said first mounting portions;
   third mounting portions formed in response to said first mounting portions on one end of said second holding member in an axial direction thereof;
   fourth mounting portions formed in response to said second mounting portions on an other end of said second holding member in an axial direction thereof;
   first extensible type resilient members suspended between said first mounting portions and said third mounting portions; and
   second extensible type resilient members suspended between said second mounting portions and said fourth mounting portions.

2. The suspension mechanism for a Stirling cycle engine according to claim 1, wherein said fixing portions include female screws, while said first holding member is formed with first through-holes so that said first holding member may be mounted to said fixing portions by screwing male screws thereinto, and said second holding member is formed with second through-holes, said second through-holes being larger than said first through-holes in diameter, formed opposite to said first through-holes.

3. The suspension mechanism for a Stirling cycle engine according to claim 2, wherein protectors made of a cushioning material are mounted on edges of said second through-holes.

4. The suspension mechanism for a Stirling cycle engine according to claim 3, wherein said second through-holes are closed by said protectors.

5. The suspension mechanism for a Stirling cycle engine according to claim 1, wherein said first mounting portions are formed into a downward hook shape by cutting out an upper end of said first holding member, while said second mounting portions are formed into an upward hook shape by cutting out a lower end of said first holding member.

6. The suspension mechanism for a Stirling cycle engine according to claim 1, wherein said third mounting portions are formed into an upward hook shape by cutting out an upper end of said second holding member and then inflecting it inwardly, while said fourth mounting portions are formed into a downward hook shape by cutting out a lower end of said second holding member and then inflecting it inwardly.

7. The suspension mechanism for a Stirling cycle engine according to claim 3, wherein said protector is each formed with a groove on its outer circumference so that said protector is fixed to said second holding member by fitting said groove in an edge of said second through-hole.

8. The suspension mechanism for a Stirling cycle engine according to claim 3, wherein each protector has an opening having a larger diameter than an outer end face of a head of said male screw.

9. The suspension mechanism for a Stirling cycle engine according to claim 3, wherein each protector is formed so as to provide a gap between an outer end face of a head of said male screw and the protector in a state where said protector is mounted on said second holding member.

10. The suspension mechanism for a Stirling cycle engine according to claim 3, comprising a casing for fixing said second holding member suspended by said extensible type resilient members to equipment incorporating said Stirling cycle engine, said casing being formed of two substantially semi-circular cylindrical bodies.

11. The suspension mechanism for a Stirling cycle engine according to claim 1, wherein said first holding member is a holding ring fixed to said fixing portions substantially coaxially with the Stirling cycle engine.

12. The suspension mechanism for a Stirling cycle engine according to claim 1, wherein said first holding member comprises a plurality of holding plates fixed to around the Stirling cycle engine through said fixing portions.

13. The suspension mechanism for a Stirling cycle engine according to claim 1, wherein said second holding member is a holding cylinder.

14. The suspension mechanism for a Stirling cycle engine according to claim 13, wherein said second holding member is an inner peripheral surface of equipment where the Stirling cycle engine is installed.

15. The suspension mechanism for a Stirling cycle engine according to claim 2, wherein a protector made of a cushioning material is mounted on a head of each male screw.

* * * * *